Patented May 1, 1951

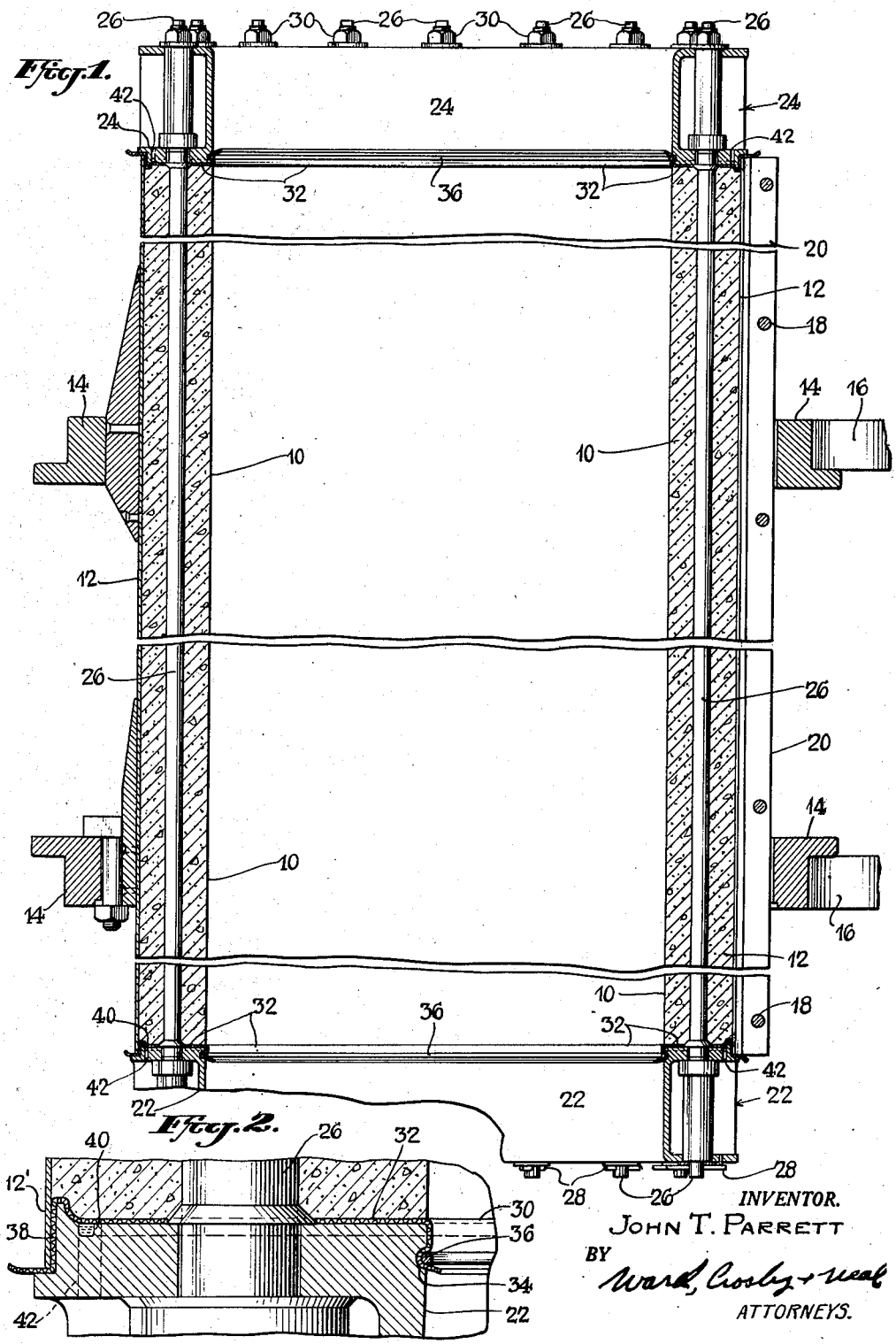

2,550,858

UNITED STATES PATENT OFFICE 2,550,858

APPARATUS AND METHOD FOR CENTRIFUGALLY MOLDING TUBULAR CONCRETE ELEMENTS

John T. Parrett, New York, N. Y., assignor to Raymond Concrete Pile Company, New York, N. Y., a corporation of New Jersey Application November 26, 1949, Serial No. 129,657

2 Claims. (Cl. 25—30)

This invention relates to the manufacture of concrete members or bodies and more particularly to apparatus and methods by which the concrete being molded is subjected to substantial centrifugal force sufficient to cause liquid to be separated from the mixture. For example, among other possibilities the invention is adapted for the manufacture of tubular concrete members by spinning in a rapidly revolving mold.

In forming tubular concrete members in this way, a considerable amount of water tends to be separated from the concrete mix by reason of the effect of centrifugal force. Since water has a lower specific gravity than the remainder of the usual concrete mixture, it will tend to travel more or less radially inwardly of the spinning mass of concrete being molded and to accumulate on the inner surface of such mass. Along the middle portions of the concrete mass, no injurious effects appear to result from such movement of the water. However, at and adjacent the ends of the spinning mass of the mixture, a peculiar action takes place, in that the water tends to be propelled from points in the concrete within an inch or less from said ends, out of the concrete and then along the surfaces of the end barriers of the mold and radially inwardly thereof, with sufficient force and in such amount as to form channels or otherwise erode and carry away particles of the mixture, with the result that the end surfaces of the desired concrete member will have numerous irregularities, and portions near the ends will have a weakened honeycomb-like structure. While these imperfections have evidently not caused serious difficulties with tubular concrete members as generally heretofore used for various purposes, yet if the finished tubular sections are to be assembled end-to-end to form, for example, continuous pre-stressed lengths of pipe or certain types of piles, it is very important that the end surfaces be accurately and tightly fitted as well as strong and capable of uniformly bearing the pressure of heavy endwise loads.

Suitable means and methods for forming concrete members for such purposes with sufficiently accurate and unweakened end surfaces, by the use of spinning operations, have, despite extensive efforts, heretofore, so far as is known, involved insurmountable difficulties for the reason above indicated.

I have discovered, however, according to the present invention, that this difficulty may be overcome by the relatively simple expedient of interposing a layer or sheet of filtering or filter-like material between the barriers at the ends of the spinning mold and the mass of concrete being cast therein. Such filtering layer or sheet allows the liquid to travel therein gradually and generally radially along the inside surfaces of the end barriers while filtering the cement from the water and maintaining the cement and the remainder of the concrete body in position so that channelling or erosion thereof is prevented and the end portions and surfaces are maintained to the desired accurate dimensions, free of irregularities or weakened portions. Preferably also small outlets for the water are provided in the mold adjacent the periphery of such filtering layer so that the liquid will travel radially outward of the layer and be expelled through such outlets, although if such outlets are not used, the liquid will be forced to travel without serious difficulty along within the filtering layer toward the axis of spinning, due to the pressure of the portions of the concrete having greater specific gravity than the liquid.

The filtering sheet or layer may take various forms, either as a permanent part of the end barriers for the spinning mold, or the form of woven or knitted cloth, or fibrous sheet material, held in place on the inside surface of the end barriers by water soluble adhesive for example, and by mechanical means if desired. For the usual concrete mix in the making of tubular concrete sections by spinning, I have found that filter material in the form of an annular area of cloth such as fine muslin is preferable, although fine mesh wire cloth may in some cases be used to provide a more permanent surface covering.

Various further and more specific objects, features and advantages of the invention will appear from the description given below taken in connection with the accompanying drawing forming a part of the specification and illustrating by way of example a preferred embodiment of the invention.

In the drawing:

Fig. 1 is a horizontal sectional view partially broken away, of one form of molding apparatus in which the invention may be used; and Fig. 2 is an enlarged view of the lower left hand portion of Fig. 1.

Referring to the drawings in further detail, there is shown at 10 a tubular concrete member after it has been formed within a drum or chamber 12 by the spinning of the latter. The drum is formed on its exterior with annular tracks 14 adapted to roll on rollers as at 16 during the spinning operation, such rollers (or the drum)

being connected to a suitable source of power (not shown) for causing rotation of the drum.

The main body portion of the drum may comprise a cylindrical or other tubular form made of sheet metal, the longitudinal edges of which respectively are secured together as by bolts 18 passing through steel angles 20 which are welded or otherwise secured respectively to said edges.

End pieces or barrier means of annular form as at 22, 24 are provided in a position to extend partially into the two ends respectively of the chamber 12. These serve to provide surfaces defining the end surfaces of the concrete member 10 as molded in the apparatus. The members 22 and 24 are shown as secured together by mandrel means 26. (The specific construction of the mandrel means used forms no part of the present invention, although it may be noted that same may comprise rods or tubes covered by rubber to facilitate easy withdrawal thereof from the cavities in the concrete after same has set.) Such mandrel means are secured as by nuts 30 at one end and as by transverse pins 28 passing therethrough at the other end. A plurality of these mandrel means, as shown, may be arranged in parallel relation at circumferentially spaced positions around inside the region where the concrete is to be molded and same may act as cores to form longitudinal holes through the wall of the concrete member 10. That is, after spinning of the apparatus and after the concrete has become sufficiently firm in the position shown, the mandrel means may be disconnected from one or the other of the members 22, 24, and the latter members may be removed with the mandrel means attached to one or the other thereof, thus leaving longitudinal cavities in the concrete to accommodate tensioned wires or other prestressing reinforcing means which may be threaded through such cavities when the concrete members are being installed in position for use.

As best shown in Fig. 2, the inner annular surface portion of member 22 (as well as of member 24) is covered with a layer of one or another of the above-mentioned filtering materials or filter-like materials (as indicated at 32). It will be apparent that such filtering material may be cut in the form of an annular ring-like area and that the inner peripheral edge may be folded down over the inside surface of the member 22. The latter surface is preferably formed with an annular groove as at 34 into which the filter material is pressed and retained by an annularly shaped piece of wire or the like 36. The filtering material, of course, may be formed with suitable apertures allowing the mandrel means 26 to pass therethrough. The outer peripheral edge of the filtering material as at 38 is folded over a part of the outer surface of the member 22 and held in position by the overlying end edge portions 12' of the chamber member 12.

The layer of filtering material 32 is preferably adhered in place by a suitable water releasable adhesive, such, for example, as a simple paste of flour and water. Such adhesion insures that during the introduction of the concrete into the mold, the filtering layer will lie firmly against the surfaces of the end barriers without danger of air pockets forming thereunder and avoiding the possibility that bodies of water or cement will accumulate beneath the filtering material, preventing it from assuming its proper position to define the end surfaces of the desired concrete body being cast.

As best shown in Fig. 2, the inner surface of the member 22 adjacent its periphery is formed with a circumferential groove 40, which groove at several spaced points about the member 22 communicates with longitudinally extending outlet openings as at 42.

It will be understood that, except as above indicated, the two end portions of the molding apparatus may be of the same construction.

In using the apparatus as shown, the wet concrete mix which is to form the concrete member 10, is introduced into the molding apparatus while the chamber is rotating at a speed fast enough to cause the mixture to distribute itself around the inside of the chamber, and then preferably the speed of rotation is increased, for example to such an extent that the periphery of the chamber will rotate at a linear speed of about 3000 ft. per minute, such spinning being maintained say for about ten minutes. During this time a substantial portion of the water or other liquid in the concrete mix will be caused by centrifugal force to more or less separate from the mixture and travel generally radially inwardly of the concrete and accumulate on the inside surface of the mass 10. However, as above explained, a considerable amount of the water which is in the concrete near the ends of the mass, as well as the water at the ends of the mass, would normally tend to travel along the easiest path, viz. along the smooth surface of the members 22 and 24 in sufficient amount and with sufficient force to carry along with it a part of the cement or other ingredients of the mixture, thus leaving the end portions of the concrete with a honeycomb-like structure and causing generally radial channels to be eroded away along the end surfaces of the concrete. However, with the above described layers of filtering material 32 in place, these will act substantially as a filtering means to retain the cement and other particles of the mixture in place, yet allowing the water gradually to pass along the inner surfaces of the members 22, 24 by seepage through the interstices of the filtering material. If cavities and apertures as at 40, 42 are present, the water will be free to pass along within the filtering material radially outward and escape through the passages and cavities. On the other hand, if such passages and cavities are omitted, the pressure of the concrete and the centrifugal forces will be such that water will pass along within the filter-like material radially inward. In either case the concrete at the ends of the mass will remain substantially intact and thus the concrete body will be formed with accurately shaped end surfaces free of channels or weakened areas. As soon as the wet concrete mix comes firmly against the filtering layer 32, it will no longer be necessary to retain the filtering layers by the adhesive against separation from the members 22, 24, and the water in the mix will act to release such adhesive and insure that the interstices in the filtering layer will be sufficiently open to permit seepage therethrough of the water.

As above explained, among other materials as the filtering means, muslin cloth may preferably be used, woven with about 128 threads per inch, for example. If desired, the mesh of the filtering layer may be sufficiently prominent so that its pattern will appear cast in the end surfaces of the concrete member. This, under certain circumstances, will provide a desirable surface to insure firm bonding of whatever sealing means may be applied to the end of the member when in use.

The concrete is finally allowed to stand in the apparatus for a considerable period and until it has set with sufficient firmness to permit its removal from the mold. At that time or previously, the end members and mandrel means may be removed. The tubular portion of the chamber may be opened up by removing the bolts 18 to permit removal of the finished concrete member.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. In apparatus for molding concrete by spinning a mass of wet concrete mixture, the combination comprising a tubular chamber, means for supporting said chamber and spinning same about a longitudinal axis, said chamber having barrier means at an end with a surface transverse to the axis of rotation for substantially defining an end surface of the concrete member to be formed, and an area of filtering material covering said end barrier surface for protecting the end surface of the concrete against erosion due to radial expulsion of water from the spinning concrete mixture, said filtering material providing interstices along the end barrier surface through which water filtered thereby may be expelled radially by the centrifugal force of the spinning.

2. In a method for forming a tubular concrete member in a tubular rotatable chamber having a barrier at its end with a surface transverse to the axis of rotation for substantially defining the end surface of the member, the combination of steps which comprises covering said end barrier surface with an area of filtering material, introducing wet concrete mix into said chamber and spinning the latter about a longitudinal axis at a sufficient speed to cause the concrete to be distributed over the inside of the chamber and forcefully to expel water from the mix by centrifugal action, said filtering material acting to protect the end surface of the member against erosion by filtering water from the adjacent portions of the mix through the material and such material providing interstices along the end barrier surface through which such water is expelled radially by said centrifugal force.

JOHN T. PARRETT.

REFERENCES CITED

The following references are of record in the file of this patent:

UNITED STATES PATENTS

| Number | Name | Date |
|---|---|---|
| 1,786,586 | Walter | Dec. 30, 1930 |
| 2,310,391 | Brooks et al. | Feb. 9, 1943 |
| 2,310,400 | Crane et al. | Feb. 9, 1943 |